(12) United States Patent
Shimoyama et al.

(10) Patent No.: US 10,035,497 B2
(45) Date of Patent: Jul. 31, 2018

(54) WIPER BLADE

(71) Applicants: Mitsuba Corporation, Gunma (JP); Honda Motor Co., Ltd., Tokyo (JP)

(72) Inventors: Masayuki Shimoyama, Gunma (JP); Masayuki Arima, Gunma (JP); Daisuke Kobayashi, Gunma (JP); Takeshi Sasaki, Saitama (JP); Tatsuya Ohmaru, Saitama (JP); Taisuke Goto, Saitama (JP); Hiroki Fujiya, Saitama (JP)

(73) Assignees: Mitsuba Corporation, Kiryu-shi, Gunma (JP); Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 15/031,500

(22) PCT Filed: Aug. 7, 2014

(86) PCT No.: PCT/JP2014/070926
§ 371 (c)(1),
(2) Date: Apr. 22, 2016

(87) PCT Pub. No.: WO2015/059979
PCT Pub. Date: Apr. 30, 2015

(65) Prior Publication Data
US 2016/0264102 A1    Sep. 15, 2016

(30) Foreign Application Priority Data
Oct. 24, 2013   (JP) .................................. 2013-221003

(51) Int. Cl.
*B60S 1/52*     (2006.01)
*B60S 1/38*     (2006.01)
*B60S 1/40*     (2006.01)

(52) U.S. Cl.
CPC ............. *B60S 1/524* (2013.01); *B60S 1/3862* (2013.01); *B60S 1/3881* (2013.01);
(Continued)

(58) Field of Classification Search
CPC .. B60S 1/46; B60S 1/522; B60S 1/524; B60S 1/482; B60S 1/3862; B60S 1/52
(Continued)

(56) References Cited

U.S. PATENT DOCUMENTS 3,448,482 A * 6/1969 Close ........................ B60S 1/48
                                                        15/250.04
6,442,788 B1   9/2002 Fleischer
(Continued)

FOREIGN PATENT DOCUMENTS

CN   101213121 A   7/2008
CN   103079911 A   5/2013
(Continued)

OTHER PUBLICATIONS

International Search Report for International Application No. PCT/JP2014/070926 dated Nov. 11, 2014.
(Continued)

*Primary Examiner* — Gary Graham
(74) *Attorney, Agent, or Firm* — McCormick, Paulding & Huber LLP

(57) ABSTRACT

A washer apparatus 50 is provided to a coupling portion CN between a blade rubber 20 and a holder member 30, and has a length in a longitudinal direction of the blade rubber 20, which is set to be shorter than that of the blade rubber 20 in the longitudinal direction, and inner-peripheral-side-oriented injection nozzles 53a and 55a and an outer-peripheral-side-oriented injection nozzle 54a have openings oriented to respective ends of the blade rubber 20 in the longitudinal direction.

4 Claims, 9 Drawing Sheets

(52) U.S. Cl.
CPC .............. *B60S 1/4016* (2013.01); *B60S 1/522* (2013.01); *B60S 1/3863* (2013.01)

(58) Field of Classification Search
USPC .......................................... 15/250.02, 250.04
See application file for complete search history.

(56) References Cited

U.S. PATENT DOCUMENTS

| | | | |
|---|---|---|---|
| 2012/0090123 A1 | 4/2012 | Caillot et al. | |
| 2012/0260939 A1* | 10/2012 | Jeuffe | B60S 1/524 134/6 |
| 2013/0152320 A1 | 6/2013 | Matsumoto | |
| 2015/0013095 A1* | 1/2015 | Caillot | B60S 1/3862 15/250.34 |
| 2015/0175133 A1 | 6/2015 | Caillot et al. | |
| 2015/0175134 A1 | 6/2015 | Caillot et al. | |
| 2015/0175135 A1 | 6/2015 | Caillot et al. | |

FOREIGN PATENT DOCUMENTS

| | | | |
|---|---|---|---|
| DE | 102004007351 A1 | | 9/2005 |
| FR | 2604962 A1 | | 4/1988 |
| FR | 2806993 A1 | | 10/2001 |
| FR | 2933933 A1 | | 1/2010 |
| GB | 410259 | * | 5/1934 |
| GB | 2356130 | * | 5/2001 |
| JP | 2002-536244 A | | 10/2002 |
| JP | 2003-48517 A | | 2/2003 |
| JP | 2011-502876 A | | 1/2011 |
| JP | 2013-79029 A | | 5/2013 |

OTHER PUBLICATIONS

Supplementary European Search Report for Serial No. EP 14 85 6732 dated May 16, 2017.

* cited by examiner

WIPER BLADE

CROSS REFERENCE TO RELATED APPLICATION

Applicant hereby claims foreign priority benefits under U.S.C. § 119 from International Patent Application Serial No. PCT/JP2014/070926 filed on Aug. 7, 2014 and Japanese Patent Application No. 2013-221003 filed on Oct. 24, 2013, the contents of both are incorporated by reference herein.

TECHNICAL FIELD

The present invention relates to a wiper blade attached to a wiper arm provided to a vehicle to make a reciprocating wiping-out motion on a windshield.

BACKGROUND ART

A wiper apparatus for ensuring a field of view from a driver and the like through a windshield is mounted on a vehicle such as an automotive vehicle. The wiper apparatus includes: a wiper arm driven and swung by an electric motor; and a wiper blade attached to the wiper arm. The wiper blade includes: a holder member attached to a tip portion of the wiper arm; and a blade rubber held by the holder member. When a wiper switch provided inside the vehicle is turned ON, the wiper arm is driven and swung, thereby causing the blade rubber to make reciprocating motion on a windshield, and to wipe off rain water and the like on the windshield.

For example, when extraneous matters such as dust are on the windshield, the wiper blade is caused to make the reciprocating wiping-out motion while washer liquid is injected to the windshield. With this construction, extraneous matters such as dust can get moist and the front surface of the windshield can be cleanly wiped without being damaged. Normally, the washer liquid is injected from a nozzle installed to a hood (bonnet) of the vehicle or the like on the windshield. In this case, there are disadvantages as follows. That is, the injection position of the washer liquid may intercept a field of view from a driver and the like through a windshield. Since the distance between the nozzle and the windshield is relatively long, the injection position of the washer liquid may be deviated by traveling wind or the like. Since a relatively large amount of washer liquid is used in a flow passage, a washer tank may be frequently refilled with washer liquid.

In order to solve the above-described disadvantages, for example, a wiper blade described in Re-publication of PCT International Publication No. JP2011-502876 has been developed. The wiper blade described in Re-publication of PCT International Publication No. JP2011-502876 includes a flow passage (long passage) through which washer liquid passes, and which extends in a longitudinal direction of the wiper blade. The washer liquid is injected from apertures formed in the flow passage toward the windshield, thereby wetting an area close to the blade rubber. Note that washer liquid flowing through the flow passage is supplied from a center coupling portion attached to the wiper blade.

SUMMARY

However, according to the wiper blade described in the above patent document 1, since the flow passage is provided over the entire region in the longitudinal direction of the wiper blade, the wiper blade is increased in size, and as a result, increased in cost of the wiper blade, and decreased in high-speed wiping-out performance. Furthermore, since it is provided with a relatively long flow passage, washer liquid remaining inside the flow passage may be partially frozen. In this case, for example, washer liquid may not be supplied to an end of the flow passage.

An object of the present invention is to provide a wiper blade capable of wetting an area close to a blade rubber, improved in size, and preventing washer liquid from being frozen.

In one aspect of the present invention, there is provided a wiper blade which is attached to a wiper arm provided to a vehicle to make reciprocating wiping-out motion on a windshield, the wiper blade including: a blade rubber in contact with the windshield, a holder member which holds the blade rubber, and a washer apparatus provided to a coupling portion between the blade rubber and the holder member and having a first injection nozzle which injects washer liquid, wherein the washer apparatus is set to be shorter in length than the blade rubber in a longitudinal direction thereof, the first injection nozzle has: an inner-peripheral-side-oriented injection nozzle 73$d$ having an opening oriented in a direction of the wiper arm in the longitudinal direction of the blade rubber; and an outer-peripheral-side-oriented injection nozzle having an opening oriented in a direction opposite to the wiper arm in the longitudinal direction of the blade rubber, an amount of washer liquid to be injected from the inner-peripheral-side-oriented injection nozzle is larger than that of washer liquid to be injected from the outer-peripheral-side-oriented injection nozzle.

In another aspect of the present invention, the washer apparatus includes an orthogonal plane orthogonal to the longitudinal direction of the blade rubber.

In still another aspect of the present invention, the first injection nozzle is provided to the orthogonal plane.

In still another aspect of the present invention, the blade rubber includes a main body portion held by the holder member, a lip portion in contact with the windshield, and a neck portion coupling the main body portion and the lip portion to each other, where the first injection nozzle injects the washer liquid toward a groove portion formed by the main body portion, the lip portion, and the neck portion.

In still another aspect of the present invention, the washer apparatus includes a second injection nozzle which injects the washer liquid, and the second injection nozzle injects the washer liquid toward a front side in a wiping-out direction of the blade rubber.

According to the present invention, the washer apparatus is provided to the coupling portion between the blade rubber and the holder member, the length of the washer apparatus in the longitudinal direction of the blade rubber is set to be shorter than the length of the blade rubber in the longitudinal direction, and the first injection nozzle has the opening oriented to the end of the blade rubber in the longitudinal direction.

With this construction, even if a conventional relatively-long flow passage is not provided, the washer liquid can be supplied from the first injection nozzle to the end of the blade rubber in the longitudinal direction, and in turn, a portion near the blade rubber can get wet.

Furthermore, since it is not provided with a conventional relatively-long flow passage, the entire size of the wiper blade can be prevented from increasing, and in turn, an increase in cost of the wiper blade and a decrease in high-speed wiping-out performance can be prevented.

Furthermore, since it is not provided with a conventional relatively-long flow passage, the washer liquid can be prevented from being frozen, and in turn, the washer liquid can be stably supplied to a portion near the blade rubber.

DETAILED DESCRIPTION

Hereinafter, the first embodiment of the present invention will be described in detail with reference to the accompanying drawings.

Figure 1:
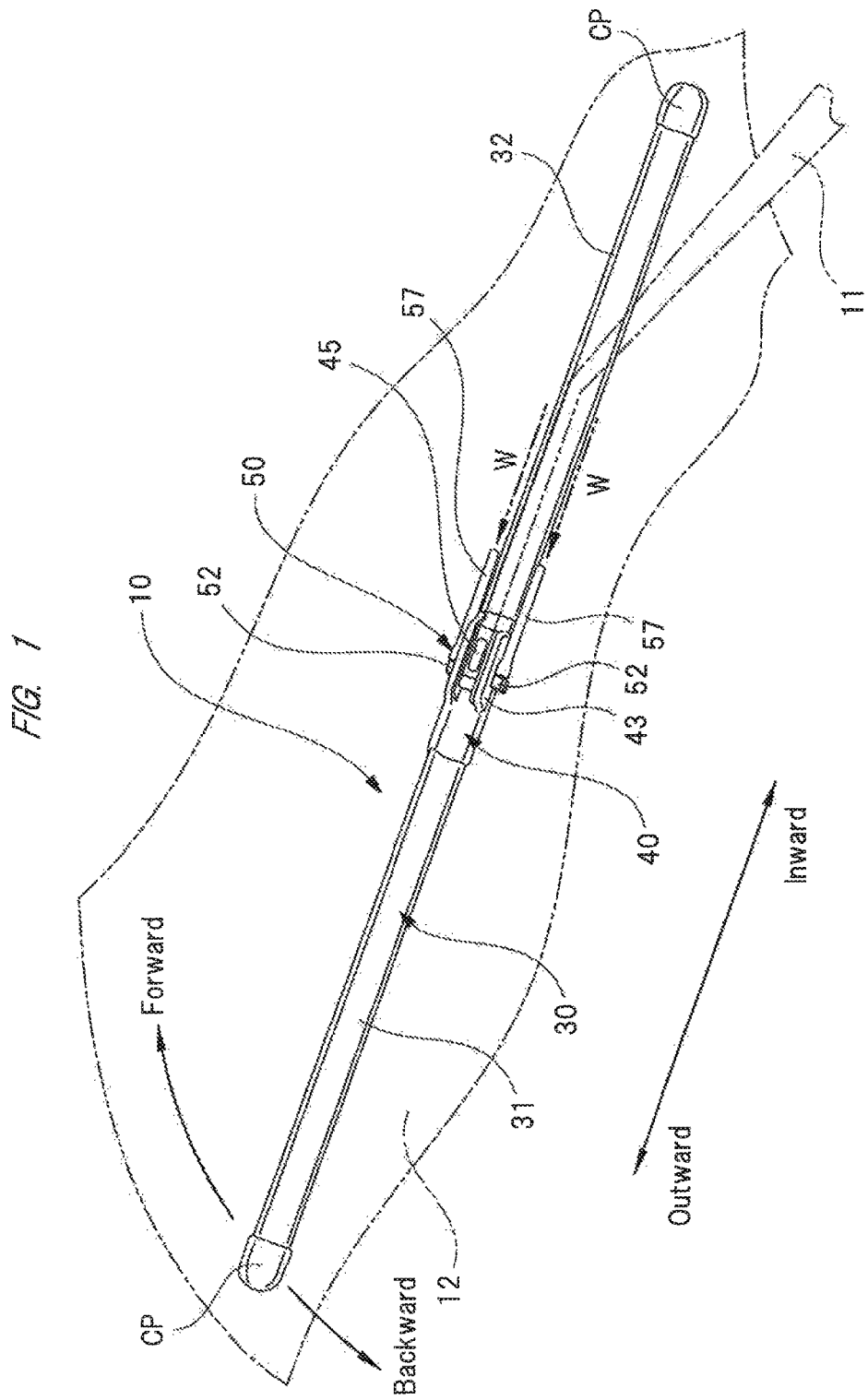
FIG. 1 is a perspective view showing an entire wiper blade of a first embodiment.
Figure 2:
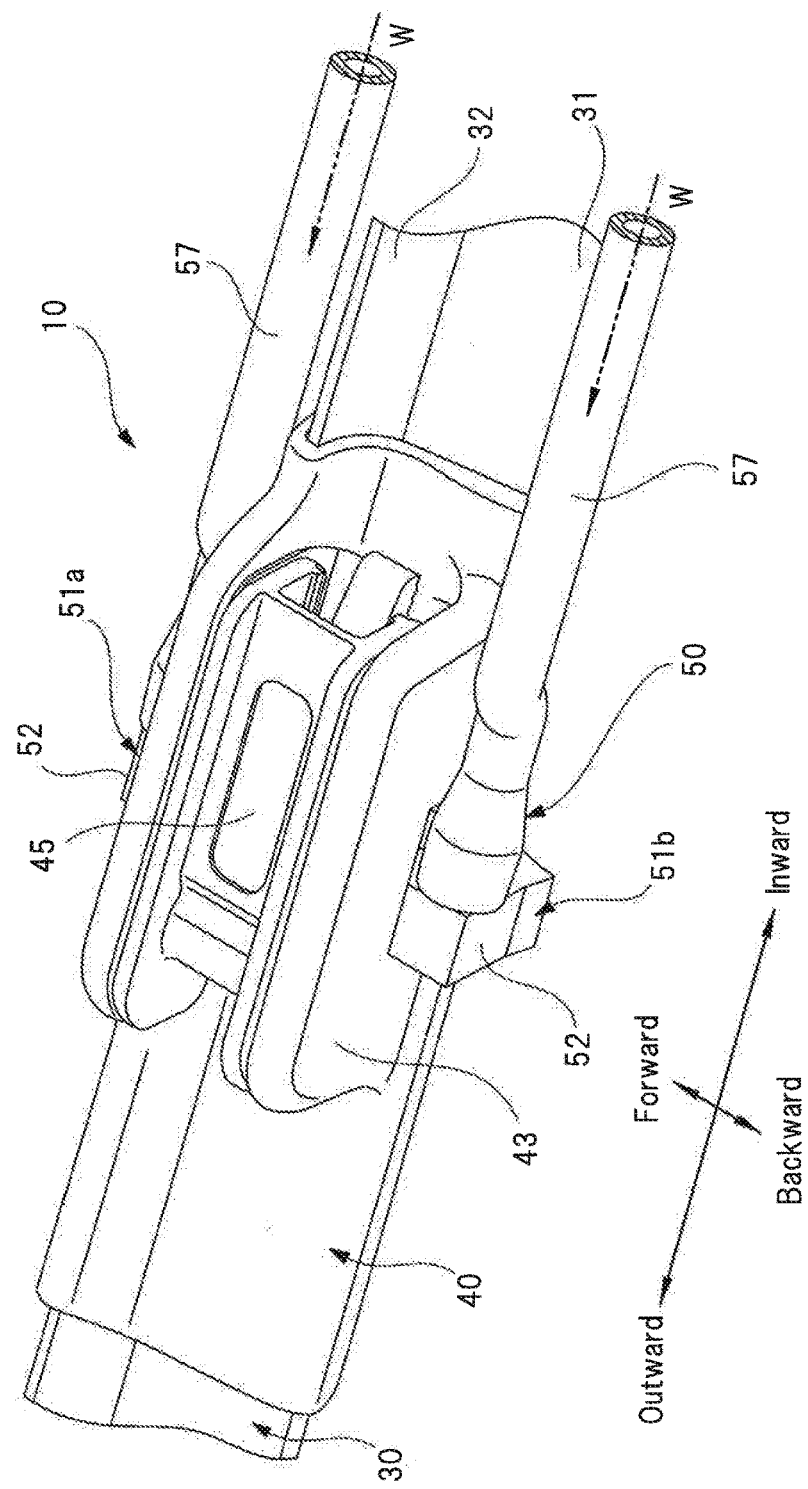
FIG. 2 is an enlarged front perspective view of a coupling member and its surroundings of the wiper blade of FIG. 1.
Figure 3:
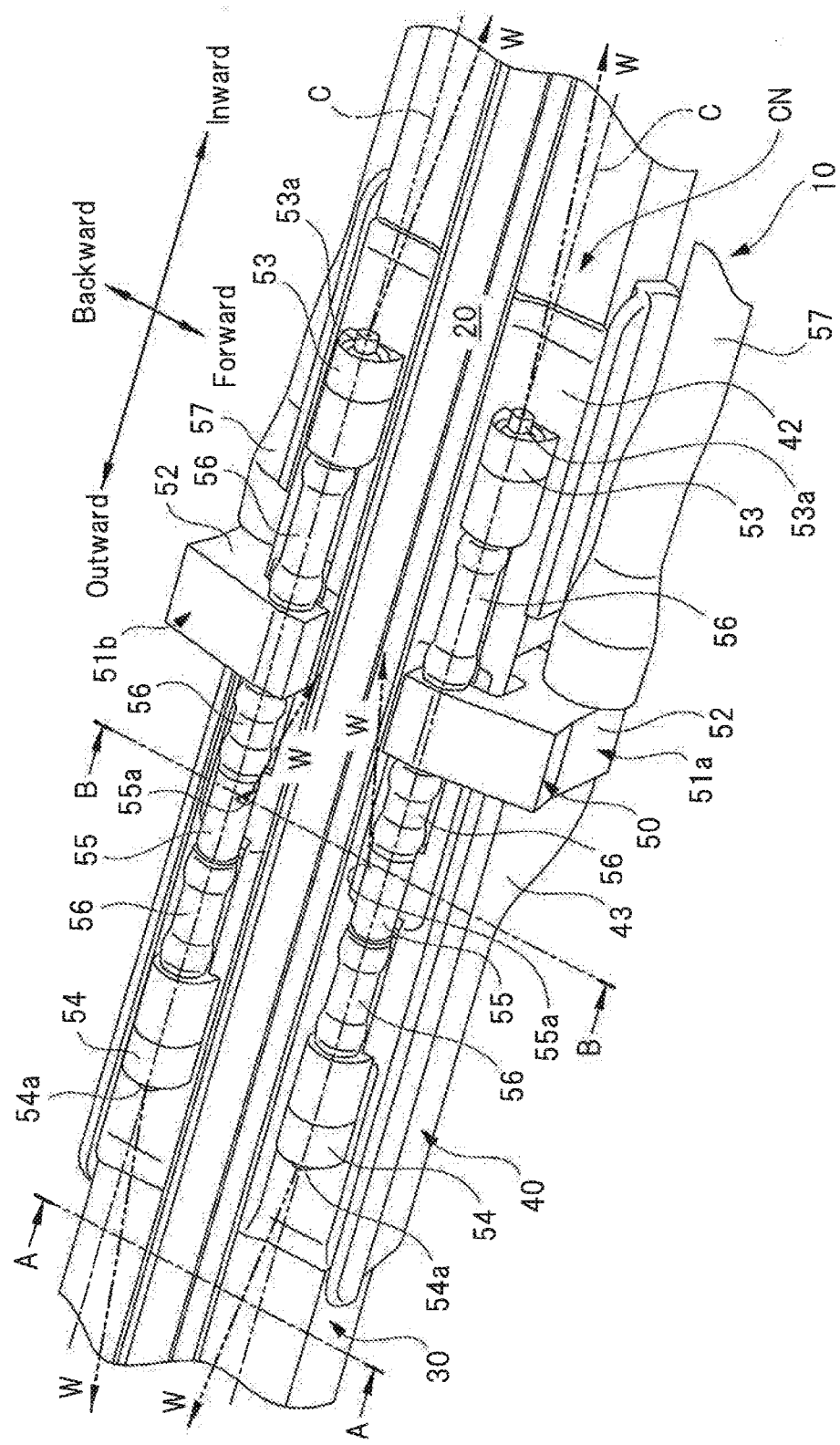
FIG. 3 is an enlarged rear perspective view of the coupling member and its surroundings of the wiper blade of FIG. 1.
Figure 4:
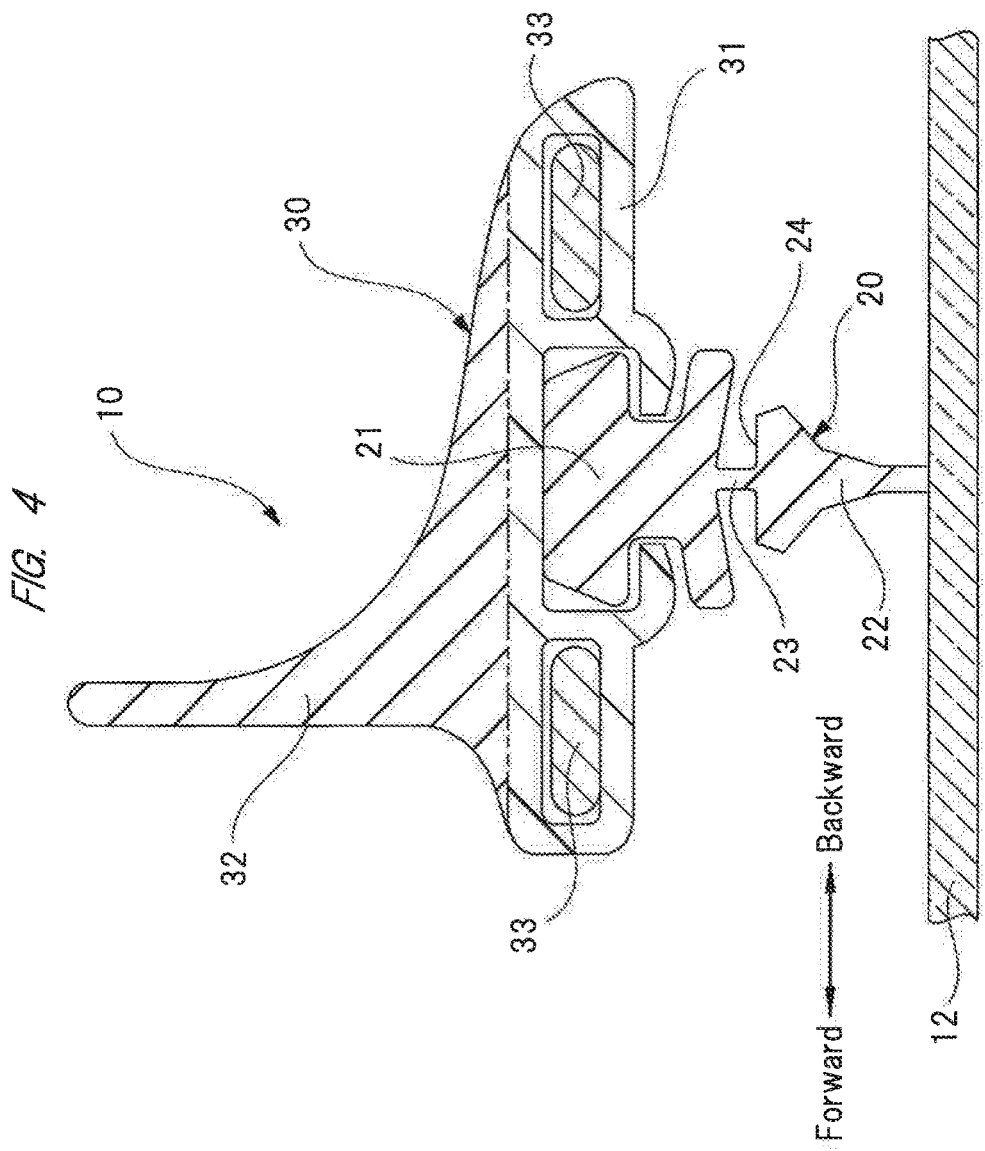
FIG. 4 is a sectional view taken along an A-A line of FIG. 3.
Figure 5:
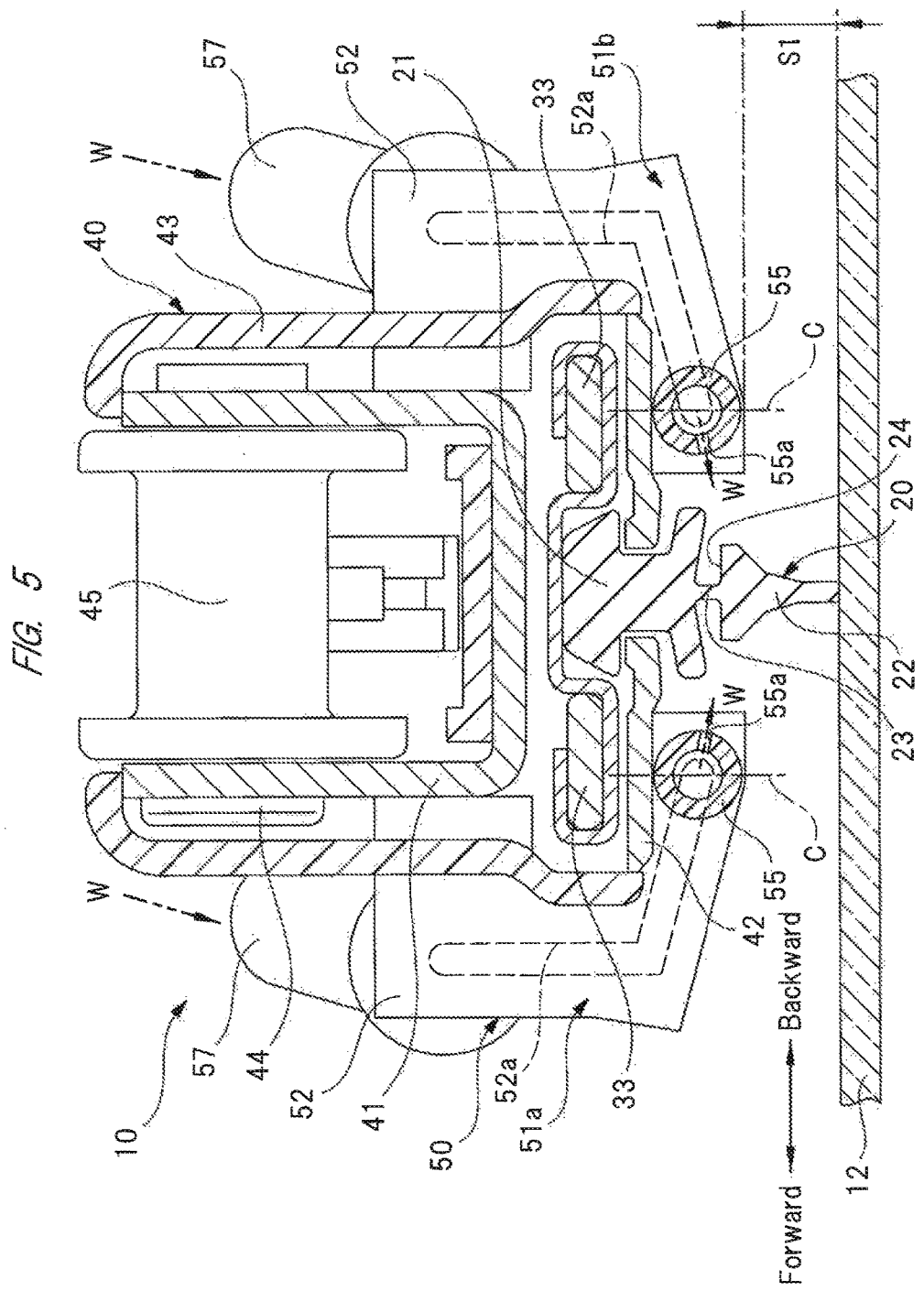
FIG. 5 is a sectional view taken along a B-B line of FIG. 3.

FIG. 1 is a perspective view showing an entire wiper blade of a first embodiment, FIG. 2 is an enlarged front perspective view of a coupling member and its surroundings of the wiper blade of FIG. 1, FIG. 3 is an enlarged rear perspective view of the coupling member and its surroundings of the wiper blade of FIG. 1, FIG. 4 is a sectional view taken along an A-A line of FIG. 3, and FIG. 5 is a sectional view taken along a B-B line of FIG. 3.

As shown in FIG. 1, a wiper blade 10 is rotatably attached to a tip portion of a wiper arm 11 provided on a front side (not shown) of a vehicle such as automotive vehicle. With ON operation on a wiper switch (not shown) provided inside a cabin, the wiper arm 11 is driven for swinging with rotational driving of a wiper motor (not shown). This causes the wiper blade 10 to make reciprocating wiping-out motion in a predetermined wiping range formed on a front glass (windshield) 12 toward a forward side and a backward side as indicated by arrows in the drawing.

As shown in FIGS. 1 to 5, the wiper blade 10 includes: a blade rubber 20 in contact with the front glass 12; a holder member 30 which holds the blade rubber 20; a coupling member 40 provided to an intermediate portion of the holder member 30 in a longitudinal direction; and a washer apparatus 50 provided to the coupling member 40. Here, paired end caps "CP" are attached to both end portions of the holder member 30 in the longitudinal direction, thereby preventing the blade rubber 20 held by the holder member 30 from falling out.

As shown in FIGS. 4 and 5, the blade rubber 20 includes: a main body portion 21 held by the holder member 30; a lip portion 22 in contact with the front glass 12; and a neck portion 23 which couples the main body portion 21 and the lip portion 22 to each other. Note that the blade rubber 20 is formed so as to be long by extrusion molding of an elastic material such as rubber and has a sectional shape that is uniform over an entire region in the longitudinal direction.

The neck portion 23 has a thickness in a motion direction (lateral direction in the drawing) of the blade rubber 20 set to be thinner than that of the main body portion 21 and the lip portion 22, and therefore easily elastically deformable. Thus, when the wiper blade 10 moves to the forward side and the backward side on the front glass 12, the lip portion 22 is allowed to be tilted, and in turn, the tip portion of the lip portion 22 can smoothly follow in a moving direction of the wiper blade 10. Therefore, extraneous matter (not shown) such as rain water and dirt on the front glass 12 can be reliably wiped out.

Also, by setting the thickness of the neck portion 23 thinner than the thickness of the main body portion 21 and the lip portion 22, groove portions 24 are formed by the main body portion 21, the lip portion 22, and the neck portion 23. These groove portions 24 are disposed to face each other on the forward side and the backward side of the blade rubber 20, and washer liquid "W" (see FIGS. 3 and 5) injected from a washer apparatus 50, which will be described further below, enters each of the groove portions 24.

As shown in FIGS. 1, 2, and 4, the holder member 30 includes: a holder main body 31 and a fin portion 32. The holder main body 31 and the fin portion 32 are integrated by two-color molding of materials different in hardness from each other, and they are long, and similarly in length to the blade rubber 20.

The holder main body 31 is formed of resin material such as flexible plastic, and can follow a curved surface (not shown) of the front glass 12 while having a strength sufficient to hold the main body portion 21 of the blade rubber 20. On the other hand, the fin portion 32 is formed of elastic material such as rubber, and lower in hardness than the holder main body 31. With traveling wind hitting the fin portion 32, a downforce is applied to the wiper blade 10, thereby favorably holding the wiping-out performance of the blade rubber 20.

As shown in FIG. 4, paired vertebrae 33 are provided inside the holder main body 31 so as to be spaced apart from each other at a predetermined distance. The vertebrae 33 are each formed of a steel plate with spring properties, and are disposed so as to interpose the main body portion 21 of the blade rubber 20 from the forward side and the backward side to have a mirror image relation. In a natural state in which no external force is applied, each vertebra 33 is curved with a curvature larger than the curvature of the front glass 12, and causes the holder member 30 and the blade rubber 20 to be elastically deformed in accordance the curvature of the front glass 12. With this construction, the entire region of the lip portion 22 in the longitudinal direction is brought into intimate contact with the front glass 12.

As shown in FIGS. 1, 2, 3, and 5, the coupling member 40 is provided to an intermediate portion of the holder member 30 in the longitudinal direction. The coupling member 40 includes: a coupling main body 41; a base plate 42; and a cover member 43. The coupling main body 41 has a section formed in a substantially U-shape by press working of a steel plate, and is swaged and fixed to each vertebra 33 by integrally-provided fixing leg portions (not shown).

To the coupling main body 41, a columnar pin 44 made of a steel plate is swaged and fixed. To this columnar pin 44, a hook attachment member 45 formed of resin material such as plastic is rotatably attached. Here, to the hook attachment member 45, a U-shaped hook (not shown) formed at the tip portion of the wiper arm 11 is coupled with a single touch. That is, the wiper arm 11 is coupled to the coupling member 40.

The base plate 42 is formed by press working of a steel plate into a plate shape. This base plate 42 is also swaged and fixed to each vertebra 33 by integrally-provided fixing leg portions (not shown). Here, the coupling main body 41 is disposed on a fin portion 32 side (front side) of the holder member 30, and the base plate 42 is disposed on a holder main body 31 side (rear side) of the holder member 30.

The cover member 43 is formed of resin material such as plastic into a substantially box shape, and is attached to the outside of the coupling main body 41 by a plurality of integrally-provided engaging nails (not shown). This cover member 43 covers side surface portions of the coupling main body 41 and so forth, thereby enhancing the appearance of the wiper blade 10.

As shown in FIGS. 1, 2, 3 and 5, the washer apparatus 50 is provided to the intermediate portion of the holder member 30 in the longitudinal direction. The washer apparatus 50 is provided in the vicinity of a coupling portion CN between the blade rubber 20 and the holder member 30 (see FIG. 3). More specifically, the washer apparatus 50 is attached to the coupling member 40. The washer apparatus 50 includes: a forward-side washer mechanism 51a; and a backward-side washer mechanism 51b so that the blade rubber 20 is sandwiched between them. The washer mechanisms 51a and 51b are fixed to the coupling member 40, and symmetrically disposed with respect to the blade rubber 20.

Furthermore, the washer apparatus 50 has a length in the longitudinal direction of the blade rubber 20, which is set to be slightly shorter than that of the coupling member 40 in the longitudinal direction of the blade rubber 20. Therefore, the length of the washer apparatus 50 in the longitudinal direction of the blade rubber 20 is shorter than that of the blade rubber 20 in the longitudinal direction.

Here, the forward-side washer mechanism 51a and the backward-side washer mechanism 51b are the same in construction as each other. In the following, components of the washer mechanism 51a are provided with the same reference character of the washer mechanism 51b, and one of the washer mechanisms are described hereinafter.

Each of the washer mechanisms 51a and 51b includes: a channel block 52; an inner-peripheral-side nozzle body 53; an outer-peripheral-side nozzle body 54; an intermediate nozzle body 55; and a plurality of connection tubes 56. Here, the term "inner peripheral side" means the same side as the wiper arm 11 in the longitudinal direction of the wiper blade 10, and the term "outer peripheral side" means an opposite side (tip side) to the wiper arm 11 in the longitudinal direction of the wiper blade 10 (see FIG. 1).

The channel block 52 is formed of resin material such as plastic into a substantially "C" shape. One side of the channel block 52 is disposed on the front side of the holder member 30, and the other side of the channel block 52 is disposed on the rear side of the holder member 30. That is, the channel block 52 extends in a direction crossing the longitudinal direction of the blade rubber 20 so as to hold the holder member 30 on both sides of the holder member 30 in a direction interposing the blade rubber 20.

Inside the channel block 52, a flow passage 52a is formed along the shape of the channel block 52. One end of an inflow-side tube 57 is connected to an entrance side of this flow passage 52a, that is, to a front side of the holder member 30. Note that a washer pump (not shown) installed inside an engine room of the vehicle is connected to the other end of the inflow-side tube 57. The inflow-side tube 57 is disposed on an inner peripheral side in the longitudinal direction of the blade rubber 20, thereby allowing the other end of the inflow-side tube 57 to be easily introduced into the engine room.

By operating a washer switch (not shown), the washer pump is driven to cause the washer liquid "W" to be supplied into the flow passage 52a via the inflow-side tube 57. Here, by switching driving of the washer pump, the washer liquid "W" is supplied only to the forward-side washer mechanism 51a when the wiper blade 10 is moving to a forward side, and the washer liquid "W" is supplied only to the backward-side washer mechanism 51b when the wiper blade 10 is moving to a backward side.

The paired connection tubes 56 are connected to an exit side of the flow passage 52a, that is, to the rear side of the holder member 30 in the longitudinal direction of the blade rubber 20. The connection tubes 56 connected to the flow passage 52a are disposed to face each other in the longitudinal direction of the blade rubber 20 so that the channel block 52 is sandwiched between them. That is, the exit side of the flow passage 52a is branched to both sides in the longitudinal direction of the blade rubber 20.

As shown in FIG. 3, the inner-peripheral-side nozzle body 53 is fixed to an inner peripheral side (right side in the drawing) of the base plate 42 across the channel block 52. The connection tube 56 is connected to the inner-peripheral-side nozzle body 53, thereby causing the washer liquid "W" from the flow passage 52a to be supplied to the inner-peripheral-side nozzle body 53.

The inner-peripheral-side nozzle body 53 includes an inner-peripheral-side-oriented injection nozzle 53a having an opening oriented to an end of the blade rubber 20 in the longitudinal direction on the inner peripheral side. Furthermore, the opening of the inner-peripheral-side-oriented injection nozzle 53a is oriented to the groove portion 24 of the blade rubber 20 (see FIG. 5). With this construction, as indicated by a two-dot-chain line in the drawing, the washer liquid "W" injected from the inner-peripheral-side-oriented injection nozzle 53a is oriented to a portion closer to the blade rubber 20 rather than a line segment "C" (see FIGS. 3 and 5) in the longitudinal direction of the blade rubber 20 to enter the groove portion 24 at the end of the blade rubber 20 in the longitudinal direction on the inner peripheral side. Here, the inner-peripheral-side-oriented injection nozzle 53a constitutes a first injection nozzle in the present invention.

As shown in FIG. 3, on an outer peripheral side (left side in the drawing) of the base plate 42 across the channel block 52, the outer-peripheral-side nozzle body 54 is fixed. To the outer-peripheral-side nozzle body 54, the connection tube 56 is connected, thereby causing the washer liquid "W" from the flow passage 52a to be supplied to the outer-peripheral-side nozzle body 54 via the intermediate nozzle body 55.

The outer-peripheral-side nozzle body 54 includes an outer-peripheral-side-oriented injection nozzle 54a having an opening oriented to an end of the blade rubber 20 in the longitudinal direction on the outer peripheral side. Furthermore, the opening of the outer-peripheral-side-oriented injection nozzle 54a is oriented to the groove portion 24 of the blade rubber 20 (see FIG. 5). With this construction, as indicated by a two-dot-chain line in the drawing, the washer liquid "W" injected from the outer-peripheral-side-oriented injection nozzle 54a is oriented to a portion closer to the blade rubber 20 rather than the line segment "C" in the longitudinal direction of the blade rubber 20 to enter the groove portion 24 at the end of the blade rubber 20 in the longitudinal direction on the outer peripheral side. Here, the outer-peripheral-side-oriented injection nozzle 54a constitutes the first injection nozzle in the present invention.

As shown in FIG. 3, on the outer peripheral side (left side in the drawing) of the base plate 42 across the channel block 52 and between the outer-peripheral-side nozzle body 54 and the channel block 52, the intermediate nozzle body 55 is fixed. The intermediate nozzle body 55 is formed in a substantially cylindrical shape, and has both end portions where the connection tubes 56 are connected. With this construction, the washer liquid "W" from the flow passage 52a is supplied to the intermediate nozzle body 55.

The intermediate nozzle body 55 includes an inner-peripheral-side-oriented injection nozzle 55a oriented to the end of the blade rubber 20 in the longitudinal direction on the inner peripheral side. Furthermore, the inner-peripheral-side-oriented injection nozzle 55a has an opening oriented to the groove portion 24 of the blade rubber 20 (see FIG. 5). With this construction, as indicated by a two-dot-chain line in the drawing, the washer liquid "W" injected from the inner-peripheral-side-oriented injection nozzle 55a is oriented to a portion closer to the blade rubber 20 rather than the line segment "C" in the longitudinal direction of the blade rubber 20 to enter the groove portion 24 of the blade rubber 20. Here, the inner-peripheral-side-oriented injection nozzle 55a configures also the first injection nozzle in the present invention.

As described in detail above, according to the wiper blade 10 of the first embodiment, the washer apparatus 50 is provided at the coupling portion CN between the blade rubber 20 and the holder member 30, the length of the washer apparatus 50 in the longitudinal direction of the blade rubber 20 is set to be shorter than the length of the blade rubber 20 in the longitudinal direction, and the openings of the inner-peripheral-side-oriented injection nozzles 53a and 55a and the opening of the outer-peripheral-side-oriented nozzle 54a are oriented to both ends of the blade rubber 20 in the longitudinal direction.

With this construction, even if a conventional relatively-long flow passage is not provided, the washer liquid "W" can be supplied from the inner-peripheral-side-oriented injection nozzles 53a and 55a and the outer-peripheral-side-oriented nozzle 54a to both ends of the blade rubber 20 in the longitudinal direction, and in turn, a portion near the blade rubber 20 can get wet. Here, in the first embodiment, since the washer liquid "W" is supplied to both ends of the blade rubber 20 in the longitudinal direction by three injection nozzles 53a, 54a, and 55a, a portion near the blade rubber 20 can get wet in a substantially entire region in the longitudinal direction of the blade rubber 20.

Furthermore, since it is not provided with a conventional relatively-long flow passage, the entire size of the wiper blade 10 can be prevented from increasing, and in turn, an increase in cost of the wiper blade 10 and a decrease in high-speed wiping-out performance can be prevented.

Furthermore, since it is not provided with a conventional relatively-long flow passage, the washer liquid "W" can be prevented from being frozen, and in turn, the washer liquid "W" can be stably supplied to a portion near the blade rubber 20.

Furthermore, three injection nozzles 53a, 54a, and 55a inject the washer liquid "W" toward the groove portions 24 formed by the main body portion 21, the lip portion 22, and the neck portion 23. Therefore, with deformation of the groove portions 24 in accordance with the tilting of the lip portion 22 and the capillary action of the groove portions 24, the washer liquid "W" inside the groove portions 24 can be equally spread over the entire region in the longitudinal direction. Therefore, a portion near a substantially entire region of the blade rubber 20 in the longitudinal direction can uniformly get wet.

Furthermore, by providing two inner-peripheral-side-oriented injection nozzles 53a and 55a and one outer-peripheral-side-oriented injection nozzle 54a, the washer liquid "W" to be injected to the inner peripheral side in the longitudinal direction of the blade rubber 20 is larger than that of washer liquid to be injected to the outer peripheral side in the longitudinal direction of the blade rubber 20. With this construction, the washer liquid "W" is moved from the inner peripheral side to the outer peripheral side due to the centrifugal force at the time of operation of the wiper blade 10, the traveling wind received by the wiper blade 10, and so forth, and in turn, a portion near the substantially entire region in the longitudinal direction of the blade rubber 20 can uniformly get wet.

Next, the second embedment of the present invention will be described in detail with reference to the accompanying drawings.

Figure 6:
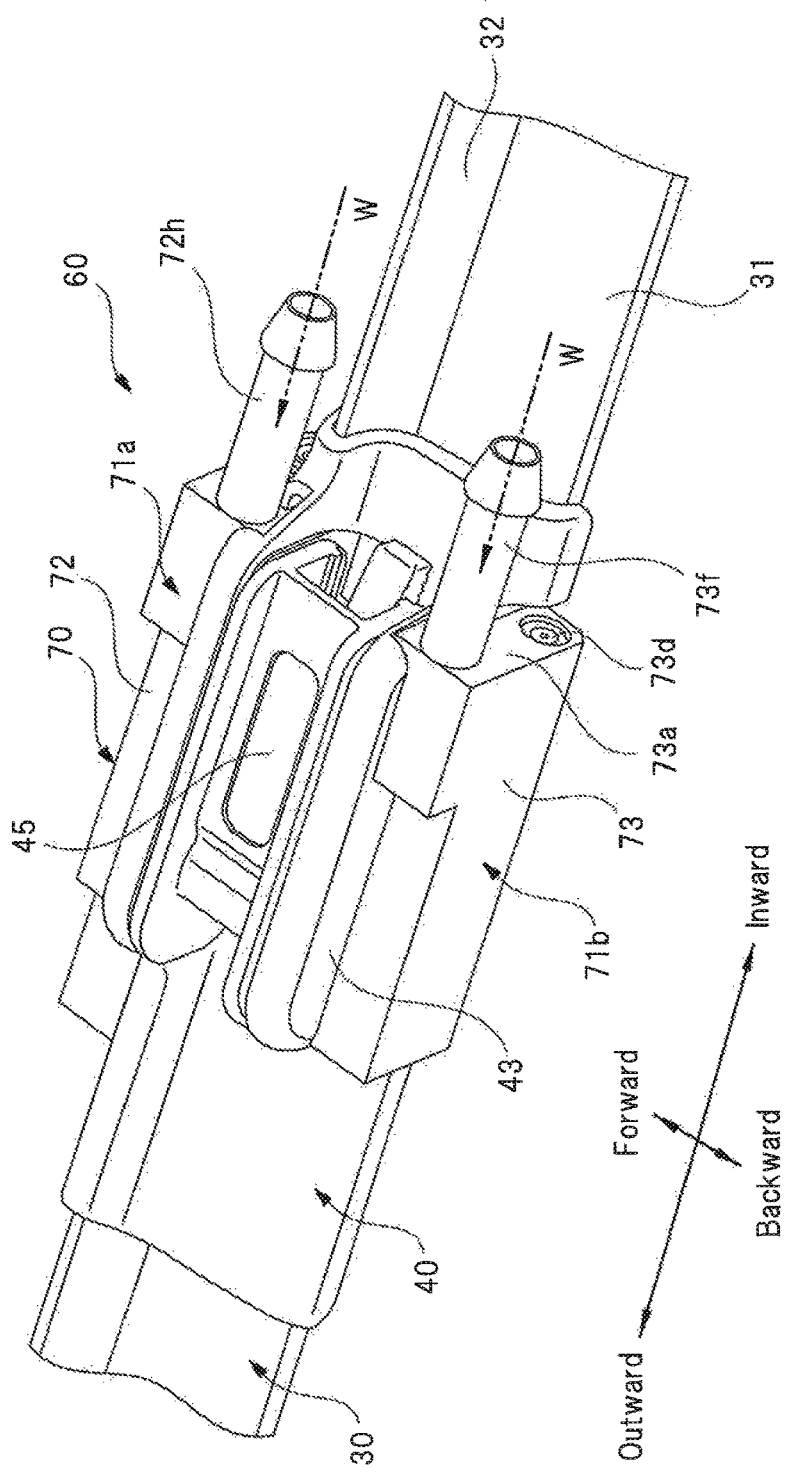
FIG. 6 is an enlarged perspective view of a wiper blade of a second embodiment corresponding to FIG. 2.
Figure 7:
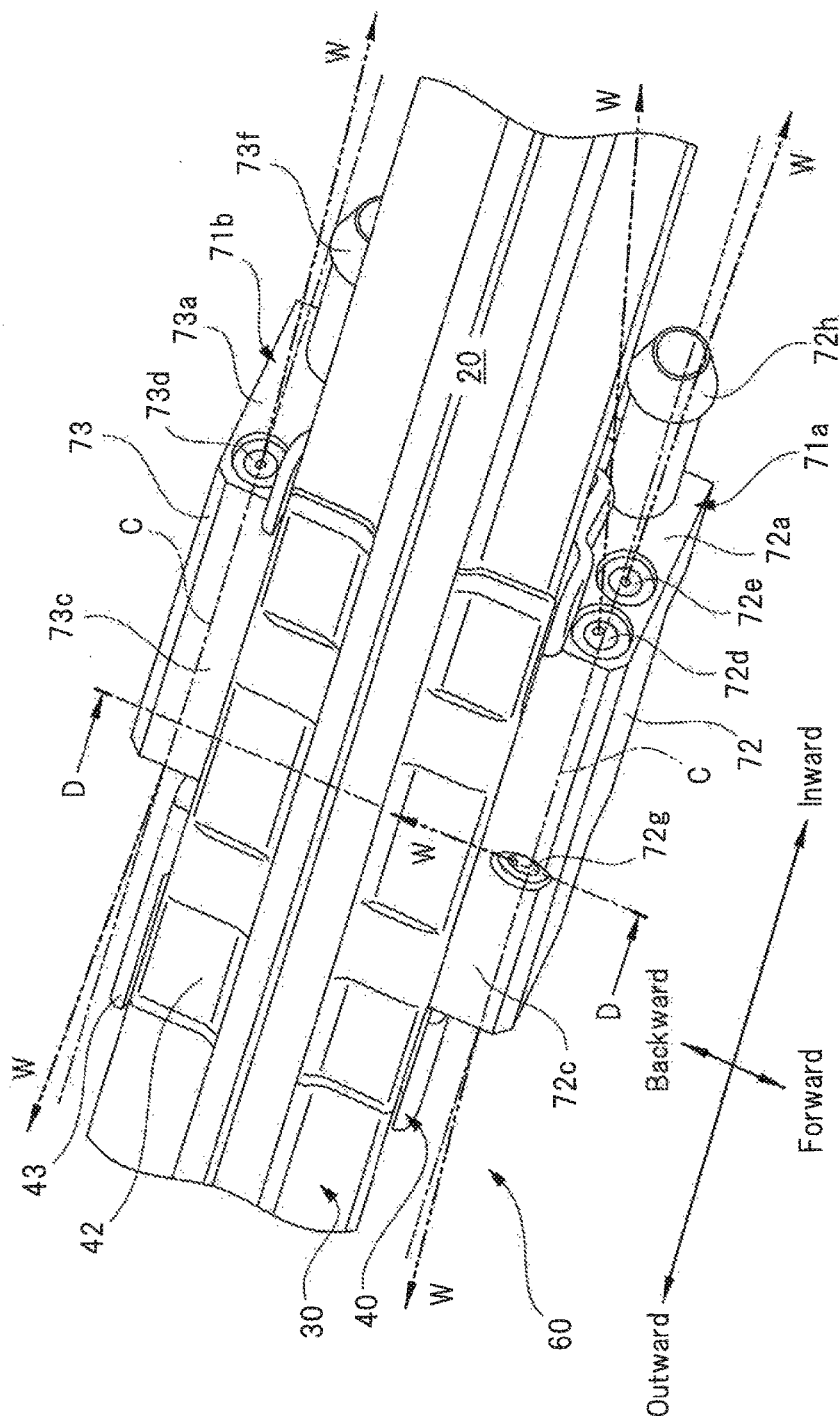
FIG. 7 is an enlarged perspective view of the wiper blade of the second embodiment corresponding to FIG. 3.
Figure 8:
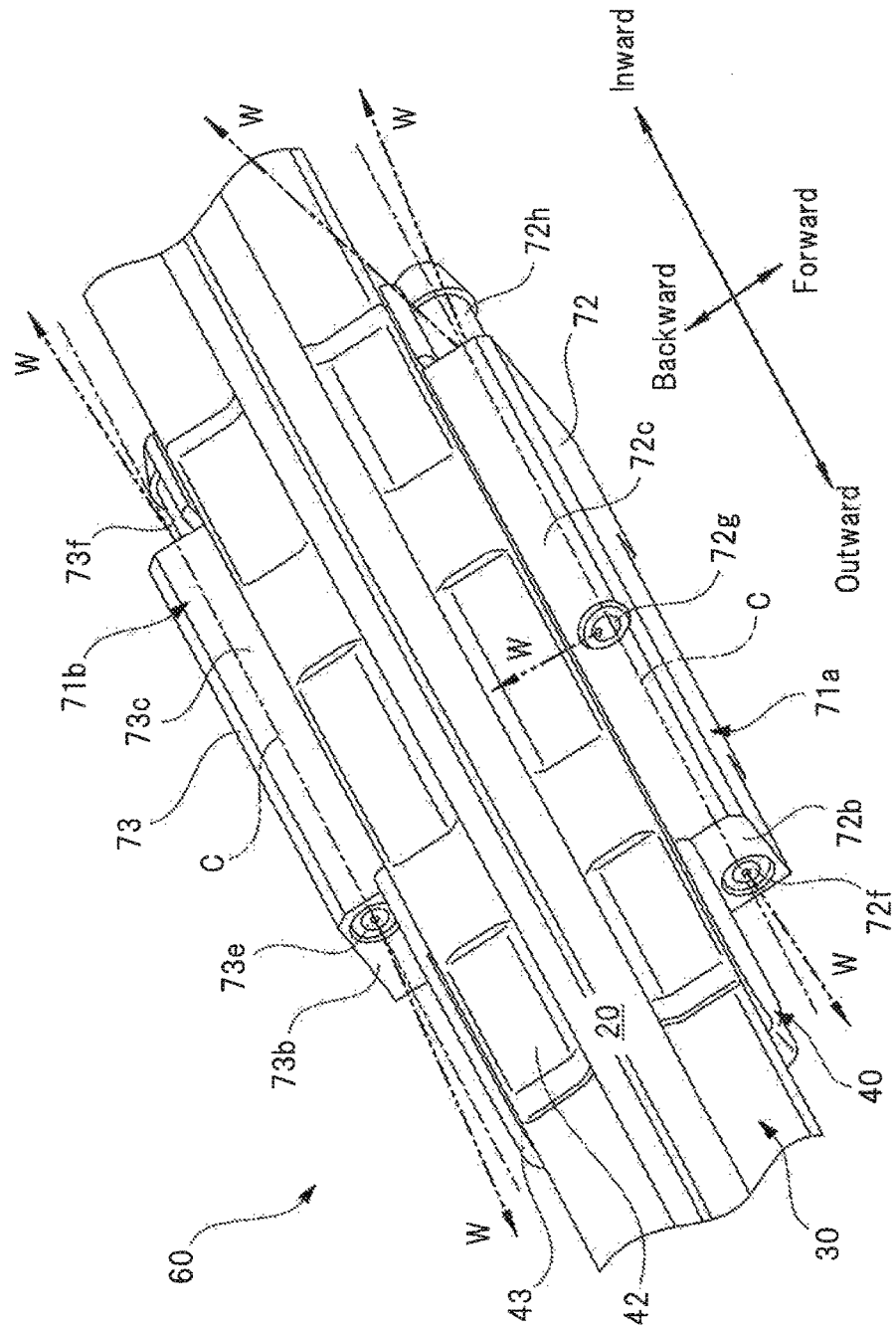
FIG. 8 is an enlarged rear perspective view of the wiper blade of the second embodiment, from another angle (outer peripheral side)
Figure 9:
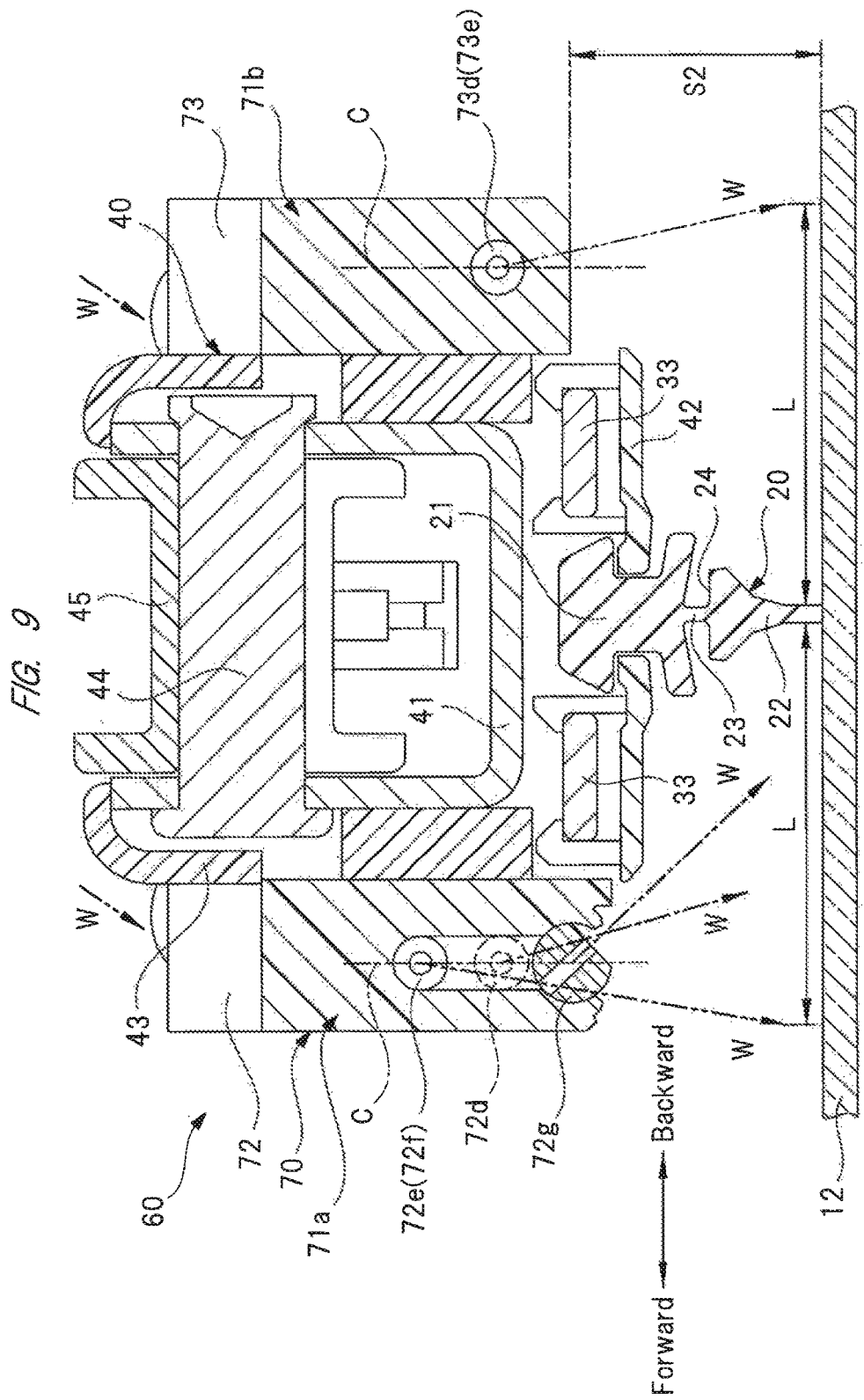
FIG. 9 is a sectional view taken along a D-D line of FIG. 7.

FIG. 6 is an enlarged perspective view of a wiper blade of a second embodiment corresponding to FIG. 2, FIG. 7 is an enlarged perspective view of the wiper blade of the second embodiment corresponding to FIG. 3, FIG. 8 is an enlarged rear perspective view of the wiper blade of the second embodiment, from another angle (outer peripheral side), and FIG. 9 is a sectional view taken along a D-D line of FIG. 7.

As shown in FIGS. 6 to 9, in a wiper blade 60 according to the second embodiment, a washer apparatus 70 is different in structure from that of the first embodiment, and a forward-side washer mechanism 71a and a backward-side washer mechanism 71b of the washer apparatus 70 are also different in shape from those of the first embodiment. Note that, as with the first embodiment, the length of the washer apparatus 70 in the longitudinal direction of the blade rubber 20 is set to be slightly shorter than the length of the coupling member 40 in the longitudinal direction of the blade rubber 20.

The forward-side washer mechanism 71a and the backward-side washer mechanism 71b respectively include: a forward-side channel block 72; and a backward-side channel block 73, which are different in shape from each other. Each of the forward-side channel block 72 and the backward-side channel block 73 is formed of resin material such as plastic, and formed into a stepped box shape.

As shown in FIGS. 7 and 8, the forward-side channel block 72 includes: an inner-peripheral-side facing portion 72a; an outer-peripheral-side facing portion 72b; and a rear-side facing portion 72c. Here, the inner-peripheral-side facing portion 72a and the outer-peripheral-side facing portion 72b are orthogonal to the longitudinal direction of the blade rubber 20. Of the inner-peripheral-side facing portion 72a and outer-peripheral-side facing portion 72b, the inner-peripheral-side facing portion 72a constitutes an orthogonal plane in the present invention.

As shown in FIG. 7, the inner-peripheral-side facing portion 72a is provided with: a first inner-peripheral-side-oriented injection nozzle 72d; and a second inner-peripheral-side-oriented injection nozzle 72e. The first inner-peripheral-side-oriented injection nozzle 72d is disposed in the vicinity of the rear-side facing portion 72c, and the second inner-peripheral-side-oriented injection nozzle 72e is disposed away from the rear-side facing portion 72c.

The first inner-peripheral-side-oriented injection nozzle 72d configures the first injection nozzle in the present invention, and has an opening oriented to an end of the blade rubber 20 in the longitudinal direction on the inner peripheral side. With this construction, the washer liquid "W" injected from the first inner-peripheral-side-oriented injection nozzle 72d is injected to a portion closer to the blade rubber 20 rather than the line segment "C" (see FIGS. 7 to 9) in the longitudinal direction of the blade rubber 20. However, unlike the first embodiment, the opening of the first inner-peripheral-side-oriented injection nozzle 72d is not oriented to the groove portion 24 of the blade rubber 20.

The second inner-peripheral-side-oriented injection nozzle 72e configures a second injection nozzle in the present invention, and has an opening oriented to a front side of the blade rubber 20 in a forward-side wiping-out direction on the inner peripheral side. That is, the washer liquid "W" injected from the second inner-peripheral-side-oriented injection nozzle 72e is injected to a side opposite to a blade rubber 20 (a side away from the blade rubber 20) rather than the line segment "C" in the longitudinal direction of the blade rubber 20.

As shown in FIG. 8, the outer-peripheral-side facing portion 72b is provided with an outer-peripheral-side-oriented injection nozzle 72f. The outer-peripheral-side-oriented injection nozzle 72f is located at a position distant from the rear-side facing portion 72c, specifically, at a position substantially the same in height as that of the second inner-peripheral-side-oriented injection nozzle 72e (see FIG. 7).

The outer-peripheral-side-oriented injection nozzle 72f configures the second injection nozzle in the present invention, and has an opening oriented to a front side of the blade rubber 20 in the forward-side wiping-out direction on the outer peripheral side. That is, the washer liquid "W" injected from the outer-peripheral-side-oriented injection nozzle 72f is injected to a side opposite to the blade rubber 20 (a side away from the blade rubber 20) rather than the line segment "C" in the longitudinal direction of the blade rubber 20.

As shown in FIGS. 7 and 8, the rear-side facing portion 72c is provided with an intermediate injection nozzle 72g. The intermediate injection nozzle 72 has an opening oriented to the blade rubber 20, and substantially perpendicular to the line segment "C" in the longitudinal direction of the blade rubber 20. That is, the washer liquid "W" injected from the intermediate injection nozzle 72g is injected toward the tip side and near the lip portion 22 of the blade rubber 20.

As shown in FIGS. 7 and 8, the backward-side channel block 73 includes: an inner-peripheral-side facing portion 73a; an outer-peripheral-side facing portion 73b; and a rear-side facing portion 73c. Here, the inner-peripheral-side facing portion 73a and the outer-peripheral-side facing portion 73b are orthogonal to the longitudinal direction of the blade rubber 20.

As shown in FIG. 7, the inner-peripheral-side facing portion 73a is provided with an inner-peripheral-side-oriented injection nozzle 73d. The inner-peripheral-side-oriented injection nozzle 73d is close to the rear-side facing portion 73c. The inner-peripheral-side-oriented injection nozzle 73d constitutes the second injection nozzle in the present invention, and has an opening oriented to a front side of the blade rubber 20 in a backward-side wiping-out direction on the inner peripheral side. That is, the washer liquid "W" is injected from the inner-peripheral-side-oriented injection nozzle 73d in a direction opposite to the blade rubber 20 (in a direction away from the blade rubber 20) rather than a direction of the line segment "C" in the longitudinal direction of the blade rubber 20.

As shown in FIG. 8, the outer-peripheral-side facing portion 73b is provided with an outer-peripheral-side-oriented injection nozzle 73e. The outer-peripheral-side-oriented injection nozzle 73e is disposed at a height position substantially equal to that of the inner-peripheral-side-oriented injection nozzle 73d (see FIG. 7). The outer-peripheral-side-oriented injection nozzle 73e constitutes the second injection nozzle in the present invention, and has an opening oriented to a front side of the blade rubber 20 in the backward-side wiping-out direction on the outer peripheral side. That is, the washer liquid "W" from the outer-peripheral-side-oriented injection nozzle 73e is injected in a direction (in a direction away from the blade rubber 20) opposite to the blade rubber 20 rather than the direction of the line segment "C" in the longitudinal direction of the blade rubber 20.

Here, as shown in FIG. 6, a forward-side tube insertion portion 72h and a backward-side tube insertion portion 73f are integrally formed with the forward-side channel block 72 and the backward-side channel block 73, respectively. The inflow-side tube 57 shown in FIG. 1 is inserted in the tube insertion portions 72h and 73f.

Furthermore, inside the forward-side channel block 72, flow passages (not shown) having one end connected to the tube insertion portion 72h and the other end connected to the injection nozzles 72d, 72e, 72f, and 72 are provided. Inside the backward-side channel block 73, flow passages (not shown) having one end connected to the tube insertion portion 73f and the other end connected to the injection nozzles 73d and 73e are provided.

Furthermore, the above-formed wiper blade 60 can achieve operation and effects substantially similar to those of the above-described first embodiment.

In addition, in the second embodiment, since the washer liquid "W" is injected in a direction opposite to the blade rubber 20 (in a direction away from the blade rubber 20) rather than the direction of the line segment "C" in the longitudinal direction of the blade rubber 20, extraneous matter on the windshield in the wiping-out direction of the blade rubber 20 can get wet in advance before being wiped out by the blade rubber 20. With this construction, the wiping-out performance by the blade rubber 20 can be more improved, an attack by dried extraneous matter against the blade rubber 20 can be decreased, and durability of the blade rubber 20 can be more improved. Here, in order to ensure a field of view from a driver or others through a windshield, as an injection position in the wiping-out direction, a distance "L" from the lip portion 22 as shown in FIG. 9 may preferably set to, for example, approximately 2 [cm].

Furthermore, in the second embodiment, as shown in FIG. 9, for example, the distance "S2" between the backward-side channel block 73 and the front glass 12 can be set to be longer than the distance "S1" between the channel block 52 and the front glass 12 in the first embodiment (see FIG. 5) (S2>S1). Therefore, at the time of operation of the wiper blade 60, for example, it is possible to reliably prevent the backward-side channel block 73 from coming in contact with the front glass 12.

Furthermore, in the second embodiment, the channel block 72 is provided with the inner-peripheral-side facing portion (orthogonal plane) 72a, the outer-peripheral-side facing portion 72b, the rear-side facing portion 72c, and the channel block 73 is provided with the inner-peripheral-side facing portion (orthogonal plane) 73a and the outer-peripheral-side facing portion 73b, with the facing portions 72a, 72b, 73a, and 73b being orthogonal to the longitudinal direction of the blade rubber 20. The facing (wall) portions 72a, 72b, 72c, 73a, and 73b are provided with a plurality of injection nozzles 72d, 72e, 72f, 72g, 73d, and 73e. Therefore, the connection tube 56 (see FIG. 3) used in the first embodiment can be omitted, and the length (size) of the washer apparatus 70 in the longitudinal direction of the blade rubber 20 can be shortened more than that of the first embodiment. Also, since the connection tube 56 is not provided, the structure of the washer apparatus 70 can be simplified, and in turn, the assembling process of the wiper blade 60 can be simplified, thereby achieving cost reduction.

Furthermore, each of the injection nozzles 72d, 72e, 72f, 72g, 73d, and 73e provided to the facing (wall) portions 72a, 72b, 72c, 73a, and 73b may be formed into a circular shape rotatably supported by the facing (wall) portions 72a, 72b, 72c, 73a, and 73b, and the direction of the washer liquid "W" oriented to the longitudinal direction of the blade rubber 20 can be easily adjusted in accordance with the preferences of the user.

The present invention is not limited to the above-described embodiments, and it is needless to say that the present invention can be variously modified within a scope not deviating from the gist of the present invention. For example, while the wiper blade 10, 60 wipes the front glass 12 as a windshield in the above-described embodiments, the present invention is not limited to this case, and the present invention may be applied to a wiper for a rear glass as a windshield.

The wiper blade is used to ensure a field of view from a driver or others through a windshield by making reciprocating wiping-out motion on the windshield by rotational driving of a wiper motor provided to a vehicle such as automotive vehicle.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A wiper blade which is attached to a wiper arm provided to a vehicle to make reciprocating wiping-out motion on a windshield, the wiper blade including:
   a blade rubber in contact with the windshield,
   a holder member which holds the blade rubber, and
   a washer apparatus provided to a coupling portion between the blade rubber and the holder member and having first injection nozzles each of which injects washer liquid,
   wherein the blade rubber includes:
   a main body portion held by the holder member;
   a lip portion which is in contact with the windshield;
   a neck portion through which the main body portion is connected to the lip portion,
   the main body portion, the lip portion, and the neck portion collectively forms a pair of groove portions,
   the washer apparatus is set to be shorter in length than the blade rubber in a longitudinal direction thereof,
   the first injection nozzles includes:
   inner-peripheral-side-oriented injection nozzles each having an opening which injects washer liquid toward the groove portions of the blade rubber; and
   outer-peripheral-side-oriented injection nozzles each having an opening oriented in a direction of one longitudinal end of the blade rubber.

2. The wiper blade according to claim 1, wherein
   the washer apparatus includes a channel block formed with a flow passage through which washer liquid is supplied to the injection nozzles,
   the channel block has orthogonal wall portions orthogonal to the longitudinal direction of the blade rubber.

3. The wiper blade according to claim 2, wherein
   the first injection nozzles are provided to the orthogonal wall portions.

4. The wiper blade according to claim 1, wherein
   the washer apparatus includes a second injection nozzle which injects the washer liquid, and
   the second injection nozzle injects the washer liquid toward a front side in a wiping-out direction of the blade rubber.

* * * * *